(12) United States Patent
Tanaka

(10) Patent No.: US 6,871,239 B2
(45) Date of Patent: Mar. 22, 2005

(54) ELECTRONIC EQUIPMENT COMMUNICATION SYSTEM, EXTERNAL DEVICE FOR THE COMMUNICATION SYSTEM, ELECTRONIC EQUIPMENT AND ELECTRONIC EQUIPMENT COMMUNICATION METHOD

(75) Inventor: Makoto Tanaka, Tokyo (JP)

(73) Assignee: Sony Computer Entertainment, Inc., Tokyo (JP)

(*) Notice: Subject to any disclaimer, the term of this patent is extended or adjusted under 35 U.S.C. 154(b) by 414 days.

(21) Appl. No.: 09/904,519

(22) Filed: Jul. 13, 2001

(65) Prior Publication Data

US 2002/0016908 A1 Feb. 7, 2002

(30) Foreign Application Priority Data

Jul. 31, 2000 (JP) ........................................ 2000-232075

(51) Int. Cl.$^7$ ............................................. G06F 13/00

(52) U.S. Cl. ........................... 710/8; 713/182; 713/189; 713/200; 710/62; 710/72

(58) Field of Search ...................... 710/3, 8–15, 36–37, 710/62, 72; 713/182–184, 189–193, 201–202; 719/321

(56) References Cited

U.S. PATENT DOCUMENTS

| | | | | |
|---|---|---|---|---|
| 4,799,061 A | * | 1/1989 | Abraham et al. | 340/5.26 |
| 5,455,919 A | * | 10/1995 | Brewer et al. | 719/321 |
| 5,598,577 A | * | 1/1997 | Overfield | 710/10 |
| 5,623,618 A | * | 4/1997 | Brewer et al. | 711/2 |
| 5,781,723 A | * | 7/1998 | Yee et al. | 713/200 |
| 5,802,365 A | * | 9/1998 | Kathail et al. | 719/321 |
| 6,009,480 A | * | 12/1999 | Pleso | 710/8 |

FOREIGN PATENT DOCUMENTS

| | | |
|---|---|---|
| JP | 62-120564 | 6/1987 |
| JP | 2-55337 | 4/1990 |
| JP | 02-122355 | 5/1990 |
| JP | 4-227548 | 8/1992 |
| JP | 6-195217 | 7/1994 |
| JP | 06-202944 | 7/1994 |
| JP | 7-146782 | 6/1995 |
| JP | 07-219885 | 8/1995 |
| JP | 08-161250 | 6/1996 |
| JP | 09-223075 | 8/1997 |
| JP | 10-111849 | 4/1998 |
| JP | 11-203230 | 7/1999 |
| JP | 2001-229018 | 8/2001 |
| TW | 358379 | 5/1999 |

OTHER PUBLICATIONS

Decision of Refusal, Jun. 8, 2004.

* cited by examiner

*Primary Examiner*—Christopher B. Shin
(74) *Attorney, Agent, or Firm*—Katten Muchin Zavis Rosenman

(57) ABSTRACT

An electronic equipment communication system has electronic equipment and an external device to be connected to the electronic equipment. Communication between the external device and electronic equipment takes place when they are connected to each other and the external device has a program recording unit, in which a control program is recorded that controls the external device itself, and a program output unit, which outputs to the electronic equipment a control program stored in this program recording unit in response to requests from the connected electronic equipment, The electronic equipment controls the external device based on a control program outputted from the program output unit. Because the external device is controlled by the optimal control program recorded in the program recording unit, the performance of the external device can be fully elicited.

14 Claims, 4 Drawing Sheets

ELECTRONIC EQUIPMENT COMMUNICATION SYSTEM, EXTERNAL DEVICE FOR THE COMMUNICATION SYSTEM, ELECTRONIC EQUIPMENT AND ELECTRONIC EQUIPMENT COMMUNICATION METHOD

BACKGROUND OF THE INVENTION

1. Field of the Invention

The present invention concerns an electronic equipment communication system that has electronic equipment and an external device connected to the electronic equipment and by which communication takes place between the two, an external device to be used in this system, electronic equipment, and an electronic equipment communication method.

2. Description of the Prior Art

With various kinds of external devices connected to electronic equipment, such as an entertainment device for home use, by connecting the external device it is possible to enjoy games or, connected to the Internet, to search for information. Taking for example a controller for operating an entertainment device, there are many different kinds, including standard controllers, controllers having a vibrator, and special controllers whose settings are set in accordance with the type of game.

If such an external device is connected to electronic equipment, in order to control the external device on the side of the main body of electronic equipment, it is necessary to build into the electronic equipment an external device control program known as a device driver, and a device driver must be available for every type of external device.

Previously such device drivers have been prerecorded on a CD-ROM or other recording medium together with the game program or other application in a general entertainment device, being called into the memory in the entertainment device when a game program is executed, thus making it possible to control the external device with the electronic equipment. In the type of electronic equipment having a hard disk, etc., all the device drivers are recorded on the hard disk, and a device driver for the connected external device is used by being called into memory.

However, there are the following problems in the method of building in device drivers in such electronic equipment.

Namely, in a new-model electronic equipment that has downward compatibility enabling it to execute applications that are used in an old-model electronic equipment, if one executes a previous application, no device driver to control the new model external device that is connected to the new-model electronic equipment will be recorded in the recording medium on which this application is recorded, so the external device cannot be used without making some modification thereto.

To prevent this, it is necessary to provide downward compatibility so that the new-model external device can be operated even with an old-model device driver. But giving external devices downward compatibility leads to higher cost and constitutes a major constraint in developing new-model external devices.

Also, although higher performance is pursued in newer controllers or other operation terminals, such as faster communication speed to keep up with improvements in processing speed of newer electronic equipment, this performance cannot be fully elicited when operating with an old-model device driver.

In addition, in the case of electronic equipment that has a hard disk, by providing the external device with a floppy disk on which the device driver is recorded and installing it on the hard disk, even with a previous application one can operate in the state in which the performance of the new-model external device is elicited. However, the installing of the driver requires a certain level of technical knowledge, making it difficult for beginners, and also difficult to adopt this method for home-use equipment such as entertainment devices.

Therefore what has been wanted was an electronic equipment communication system that would make it possible to call forth all the performance of the external device even if it is a previous application, and in which there would be no need for any complicated operation such as installing a device driver or other control program.

SUMMARY OF THE INVENTION

It is an object of this invention to provide an electronic equipment communication system, an external device, electronic equipment, and an electronic equipment communication method in which no control program installation or other complicated operation is required and in which it is possible to fully elicit the performance of the external device.

This and other objects of the present invention are achieved by an the electronic equipment communication system which comprises electronic equipment and an external device that is connected to the electronic equipment, and by which communication takes place between them, wherein said external device has a program recording unit in which a control program that controls the external device is recorded, and a program output unit that outputs the control program recorded in said program recording unit to said electronic equipment in response to requests from said electronic equipment connected to the external device, and said electronic equipment controls said external device based on a control program outputted from said program output unit.

Here, "electronic equipment" means an entertainment device or personal computer, etc. having a computation processing device such as a central processing unit (CPU), and an "external device" means peripheral equipment to be controlled by the electronic equipment, that can be connected to electronic equipment connected to such units as an operation terminal (controller), a memory device, a printer, a modem, etc.

Due to the present invention, because the external device has a program recording unit and a program output unit and can output to the electronic equipment the optimal control program for controlling the external device itself, the electronic equipment can control the external device with this optimal control program and fully elicit the performance of the external device even if a previous application that was used in an old model of the equipment is executed.

Also, because the optimal control program is outputted to the electronic equipment just by connecting the external device, no technical knowledge is required for the work of installation, etc. as there is if it comes with a floppy disk, etc., making this suitable for adoption as an entertainment device or other home-use electronic equipment communication system.

In the foregoing, it is desirable that the external device and the electronic equipment have an authentication means that authenticates whether the connection between them is a correct connection prior to the output of said control program.

Here, a method such as the following is contemplated for authenticating whether the connection between the two is a correct connection.

Namely, an authentication means is provided in the external device that encodes and outputs the external device's own identification signal, and, on the electronic equipment side, there is provided an authentication means that decodes the encoded identification signal outputted from the external device.

When the external device is connected to the electronic equipment, the external device outputs its own identification signal and the identification signal that was encoded by the authentication means, before the control program is outputted.

In the electronic equipment of the present invention, the encoded identification signal is decoded, and a comparison is made between the decoded identification signal and the identification signal sent directly from the external device; if the two identification signals match each other, it is concluded that the correct external device has been connected, and if they do not match each other, it is concluded that the external device is not the correct one.

By having an authentication means as proposed herein, it is decided whether a correct connection has been made between the two, and the control program can be outputted only if a correct connection has been made, and thus it is possible to prevent an incorrect control program, etc. from being outputted from the external device to the memory on the electronic equipment side, so that there is no possibility of misoperation, etc. arising because of the incorrect connection.

In the embodiment, the electronic equipment has a nonvolatile main body-side program recording unit that stores a control program which controls the connected external device, and a program judgment means that compares and judges control programs recorded in the main body-side program recording unit and in the program recording unit of the external device.

Because the electronic equipment has the program judgment means, it can compare and judge the control program recorded in the program recording unit of the external device and the control programs recorded in the main body-side program recording unit, and select the optimal control program. Therefore, if the optimal control program exists on the side of the main body, there is no need to output the control program from the external device, so once the electronic equipment and the external device are connected, the external device can be controlled by the electronic equipment immediately, and the external device can be used quickly.

In an embodiment, the electronic equipment has a program writing means that writes into the main body-side program recording unit the control program that is outputted from the program output unit.

Because the electronic equipment has a program writing means, when a new-model external device is connected to the electronic equipment, the control program that is outputted from the external device can be recorded in the main body-side program recording unit. Therefore, if next the same external device is connected, the control program recorded in the main body-side program recording unit can be selected by the program judgment means and used, so that the outputting of the control program in communication between the electronic equipment and the external device for the second and subsequent times can be dispensed with, and this greatly improves the convenience for the user of the electronic equipment.

Also, the present invention concerns not only the aforesaid electronic equipment communication system but also an individual external device and electronic equipment that constitute an electronic equipment communication system and an electronic equipment communication method in which the same operation and effects can be enjoyed as described in connection with the electronic equipment communication system.

Figure 1:
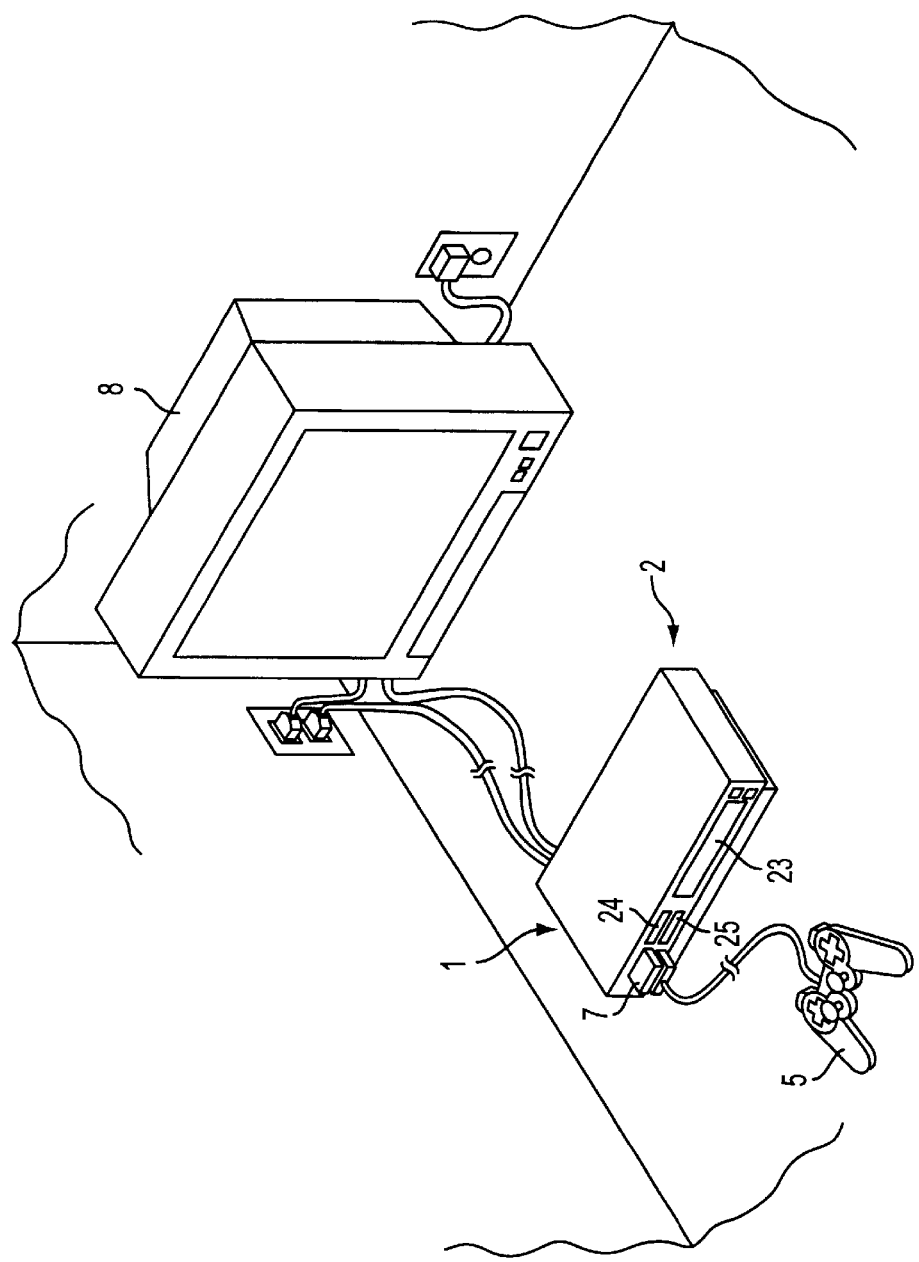
FIG. 1 is a diagrammatic perspective view of the electronic equipment communication system of an embodiment of this invention.

Explanation of the Symbols Used in the Drawings
1 electronic equipment communication system
2 entertainment device (electronic equipment)
5 controller (external device)
17, 54 authentication module (authentication means)
22 main body-side program recording unit
51 CPU (program output unit)
53 ROM (program recording unit)
211 program judgment means
212 program writing means
S6 authentication procedure
S9 program judgment procedure
S12 program output procedure
S13 program writing procedure
S14 external device control procedure

DESCRIPTION OF THE PREFERRED EMBODIMENTS

FIG. 1 shows an embodiment of the electronic equipment communication system 1 of this invention. The electronic equipment communication system 1 includes an entertainment device 2, which is the electronic equipment, a controller 5, which serves as the external device, and a card memory 7; the output of the entertainment device 2 is connected to a television receiver or other display device 8, and the images of the application that is executed by the entertainment device 2 are displayed on this display device 8. Card memory 7 is for recording the state of progress when a game or other application is executed, and it can be inserted into and extracted from entertainment device 2.

Figure 2:
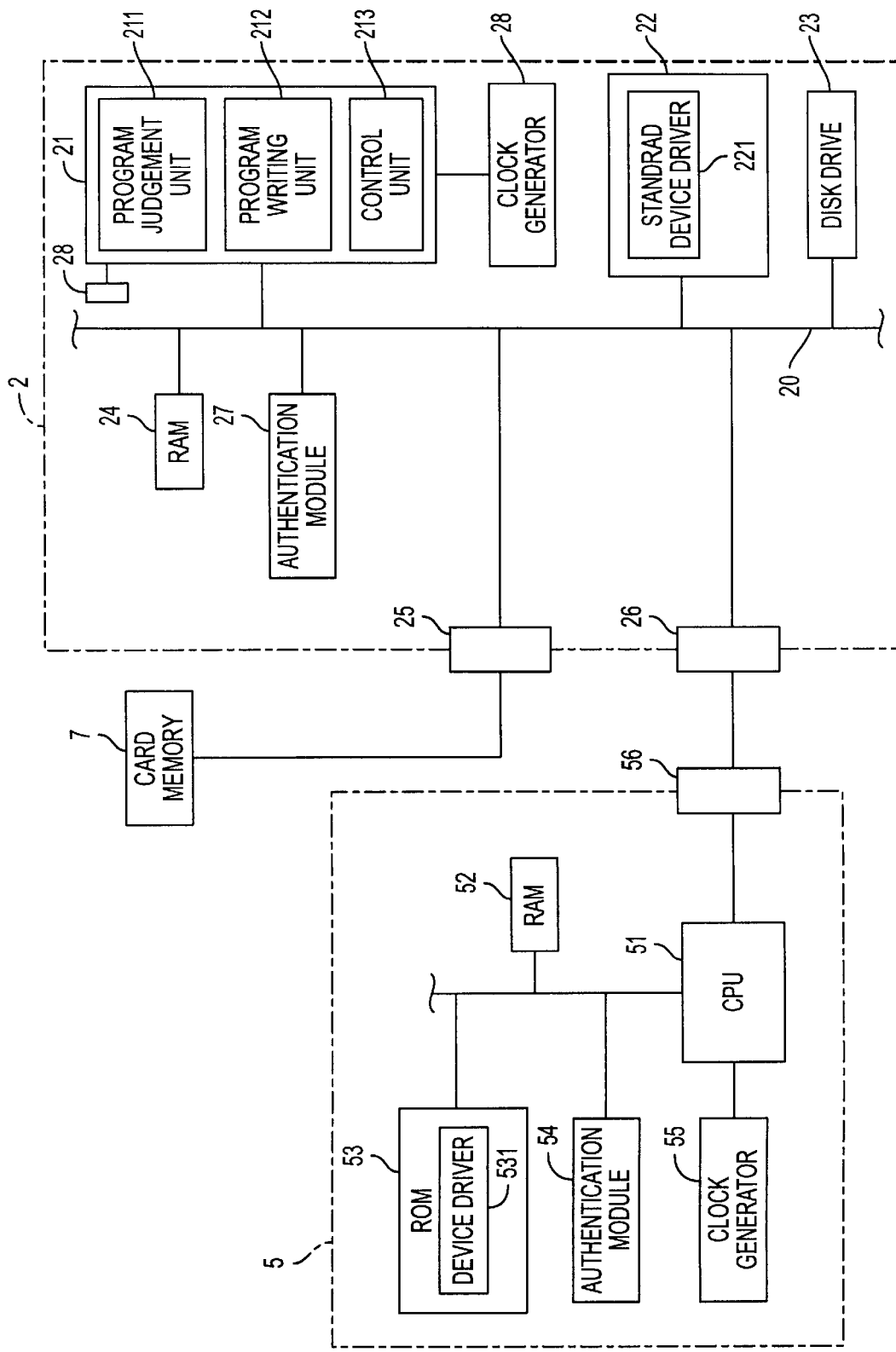
FIG. 2 is a block diagram of the electronic equipment communication system said of FIG. 1.

As shown in FIG. 2, entertainment device 2 has a CPU 21 which is connected to a bus line 20, a nonvolatile memory 22, a disk drive 23, a RAM (random-access memory) 24, a memory slot 25, a controller slot 26, and an authentication module 27. The entertainment device 2 is constituted so as to be able to execute applications that were executed on an older-model entertainment device, as well as to be able to execute applications made especially for the entertainment device 2.

The CPU 21, which has a program judgment unit 211, a program writing unit 212, and a control unit 213, and operates by a clock generated from clock a generator 28, is the part that loads information recorded in disk drive 23 and nonvolatile memory 22 into RAM 24 and uses it and does computation processing on it as necessary. Also, although not shown in FIG. 2, when an application is executed, generation of the image information and sound information that is outputted to display device 8 is done by a dedicated image processor and a sound system connected separately to bus line 20.

The program judgment unit 211, program writing unit 212, and control unit 213 are constituted as programs that are expanded on the operating system (OS), which controls the operation of CPU 21, when entertainment device 2 is activated.

Program judgment unit 211 is the part that compares a standard device driver 221 recorded in nonvolatile memory 22, the device driver supplied from the CD-ROM, DVD-ROM, or other recording medium mounted on disk drive 23, and device driver 531 supplied from controller 5, which is the external device, and selects the most appropriate device driver for controlling controller 5.

Program writing unit 212 is the part that, if it is decided that the device driver selected by program judgment unit 211 is not recorded in nonvolatile memory 22, writes this device driver into nonvolatile memory 22 as a new device driver.

Control unit 213, besides controlling nonvolatile memory 22 and disk drive 23, etc., also controls controller 5 and card memory 7, which are connected to entertainment device 2. This control unit 213 can control controller 5 by using either the device driver 221 recorded in non-volatile memory 22, a device driver supplied from an optical disk mounted on disk drive 23, or device driver 531 recorded in an internal ROM 53 (described below) of controller 5, etc.

The nonvolatile memory 22 is the part in which is recorded the standard device driver 221 of the external device connected to entertainment device 2; what is recorded in it is for example, a device driver that controls controller 5 or a device driver that controls card memory 7, etc. The nonvolatile memory 22 has, besides the main body of device driver 221, a table recording the version information on each recorded device driver and specification information on the corresponding external devices, and the program judgment unit 211 judges from this table whether a device driver is old or new.

The disk drive 23, which is the part that plays a CD-ROM, DVD-ROM, or other optical disk, has a disk tray into which are loaded an optical disk and an optical pickup unit that detects the information recorded on an optical disk loaded into it. When an optical disk on which a game or other application is recorded, is mounted in disk drive 23, its recorded content is loaded into RAM 24 and is computation-processed by CPU 21. Also, a device driver for the external devices that can be used with that application program is recorded at the beginning of the mounted game or other application program, and the external device is controlled by CPU 21 using this device driver as necessary.

RAM 24 is the part that has the function of the storage region in which data and programs are temporarily stored during computation processing by CPU 21; a device driver supplied from nonvolatile memory 22, disk drive 23, or controller 5 is loaded into RAM 24 and is executed by CPU 21 as necessary.

The memory slot 25 is the interface into which card memory 7 is inserted and by which communication takes place between entertainment device 2 and card memory 7. Card memory 7 has a flash memory mounted on its board and a wiring pattern formed in its board edge, and memory slot 25 is constituted as a card edge type connector through which electrical connection is achieved between the two when this wiring pattern part is inserted.

The controller slot 26, which is the part that connects controller 5, which is the external device, has multiple line connection terminals for communication with controller 5, and a power line connection terminal for supplying electric power to controller 5.

Authentication module 27 serving as the authentication means on the electronic equipment side is the part that decodes the encoded identification signal that is output from controller 5. The authentication module 27 consists of an application-specific integrated circuit (ASIC) that includes a logic circuit, and decoding is done by a prescribed algorithm that is set according to the type of the external device that is connected to the entertainment device.

Controller 5 as an external device is a specialized controller designed to match the new-model entertainment device 2, compared with the controller for the old-model entertainment device. The controller 5 is intended for improved performance in that (1) its communication speed is much improved, and (2) its controls consist of pressure-sensitive elements.

Controller 5, besides having CPU 51 as the program output unit, RAM 52, ROM (read-only memory) 53 as the program recording unit, authentication module 54, clock generator 55, and input-output interface 56, also has, although they are not shown, multiple pressure-sensitive controls for operating the application program, and a vibration motor that vibrates based on control signals from entertainment device 2, etc.

CPU 51, which operates by the clock generated by clock generator 55 and is the part that controls communication between controller 5 and entertainment device 2 based on control signals from entertainment device 2, is constituted so as to output device driver 531 recorded in ROM 53 to entertainment device 2 in response to a request from the entertainment device 2.

RAM 52 is the part that has the function of an auxiliary memory device in the computation processing of CPU 51.

ROM 53 is the part in which device driver 531 is recorded. The latter is the control program for controller 5. Specifically, device driver 531 is a control program provided especially for controller 5. By using this by CPU 21 of entertainment device 2, controller 5 can be operated at the highest performance consistent with its specifications.

Authentication module 54 as the external device-side authentication means, is the part that encodes its own identification signal. The authentication module 54 consists of an ASIC that, like the authentication module 27, includes a logic circuit, and encoding is done according to a prescribed algorithm.

Figure 3:
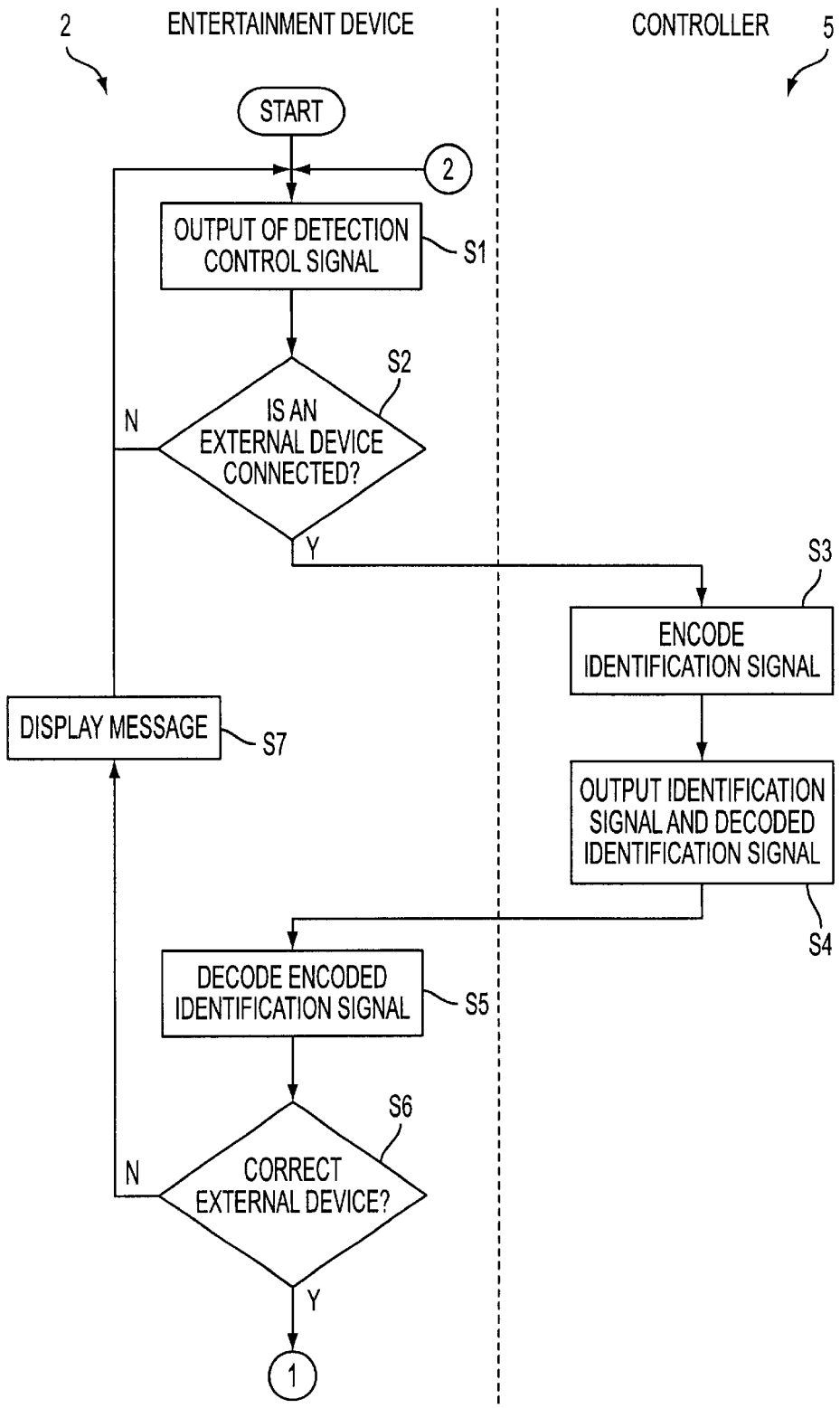
FIG. 3 is a first part of a flowchart of the operation of the electronic equipment communication system of FIGS. 1 and 2.
Figure 4:
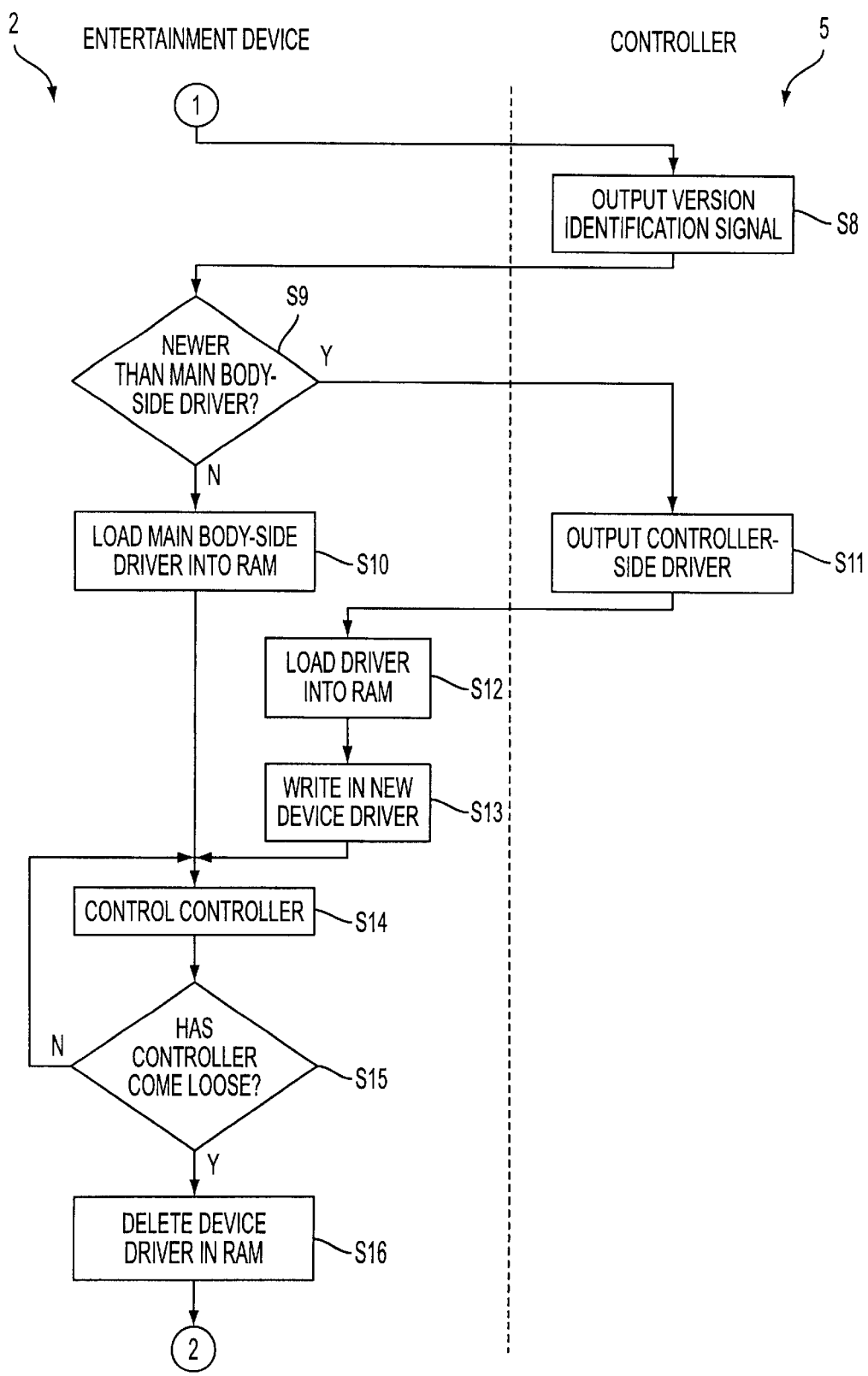
FIG. 4 is a second part of the flowchart of the operation of the electronic equipment communication system of FIGS. 1 and 2.

Now, the operation of the electronic equipment communication system 1 will be described referring to the flowchart of FIGS. 3 and 4.

(1) When an application program is mounted on disk drive 23 and entertainment device 2 is activated, control unit 213 of CPU 21 outputs a control signal for external device detection (step S1) and checks whether an external device such as controller 5 or card memory 7 is connected to the input-output interface, which includes memory slot 25 and controller slot 26 (step S2).

(2) If controller 5, which is the external device, is connected to the entertainment device 2, controller 5 encodes its own identification signal according to authentication module 54 (step S3) and outputs the identification signal and the encoded identification signal to entertainment device 2 (step S4).

(3) Entertainment device 2 decodes the encoded identification signal according to authentication module 27 (step S5), and CPU 21 compares this decoded identification signal and the identification signal outputted from controller 5 and decides whether the correct external device has been connected (step S6: authentication procedure). If the wrong controller has been connected to the entertainment device, it displays on display device 8 a message such as "This controller does not comply with the standards for this product." (step S7).

(4) If it is judged to be the correct controller 5, controller 5 outputs the version identification signal of device driver 531 in its own ROM 53 (step S8). This version identification signal is inputted into program judgment unit 211 of CPU 21 of entertainment device 2, and program judgment unit 211 compares the version identification number from controller 5 and the version of standard device driver 221 recorded in nonvolatile memory 22 and decides whether device driver 531 recorded in ROM 53 of controller 5 is newer than main body-side device driver 221 (step S9: program judgment procedure).

(5) If main body-side device driver 221 is the same version as or newer than device driver 531 of controller 5, it loads main body-side device driver 221 into RAM 24 without loading device driver 531 from controller 5 (step S10).

(6) If it is decided that device driver 531 of controller 5 is the newest, then, based on a control signal from entertainment device 2, CPU 51 of controller 5 outputs device driver 531, which is in ROM 53 (step S11), and this device driver 531 is loaded into RAM 24 of entertainment device 2 (step S12: program output procedure).

(7) Program writing unit 212 detects the loaded device driver 531 and records it in nonvolatile memory 22 as a new device driver (step S13: program writing procedure).

(8) Control unit 213 begins control of controller 5 by device driver 221 or device driver 531 loaded into RAM 24 (step S14: external device control procedure).

(9) During control by controller 5, control unit 213 monitors the state of connection of controller 5 (step S15), and if controller 5 comes loose from controller slot 26, it erases device driver 531 from RAM 24 (step S16). Thereafter, the same operation is repeated in accordance with the external device that is connected.

The above-described embodiment has the following effects:

Controller 5, which is the external device, has ROM 53, in which device driver 531 is recorded, and CPU 51 as the program output unit, and because it can output to entertainment device 2 the optimal device driver 531 for controlling the controller itself, entertainment device 2 can always control controller 5 with the optimal device driver 531 regardless of whether the application mounted in disk drive 23 is made for the new model or is for an old model, and the performance of controller 5 can be fully elicited regardless of the application.

Also, since controller 5 is constituted so that the optimal device driver 531 is loaded into RAM 24 just by connecting controller 5 to the entertainment device 2, the operation of installing a device driver using a floppy disk, etc. can be dispensed with, no technical knowledge is required, and it is suitable for adoption as entertainment device 2 or other home-use electronic equipment communication system.

In addition, entertainment device 2 and controller 5 have authentication modules 27 and 54 as authentication means, and because device driver 531 is loaded only if the correct connection is made, it is possible to prevent the wrong device driver, etc. from being loaded into the entertainment device 2 side, and based on this, the possibility of occurrence of misoperation, etc. can be completely eliminated.

Because entertainment device 2 has program judgment unit 211, it can judge, by program judgment unit 211, device driver 531, which is recorded in ROM 53 of controller 5, and device driver 221, which is stored in nonvolatile memory 22, and it can select the optimal device driver 531. Therefore if device driver 531 recorded in ROM 53 of controller 5 exists in nonvolatile memory 22, there is no need to load device driver 531, so if entertainment device 2 and controller 5 are connected, controller 5 can be controlled immediately, and controller 5 can be used quickly.

Because entertainment device 2 has program writing unit 212, when a new controller 5 is connected to entertainment device 2, device driver 531 to be loaded into RAM 24 can be recorded in nonvolatile memory 22. Therefore if, next, the same controller 5 is connected, the device driver recorded in nonvolatile memory 22 can be selected and used by program judgment unit 211, so loading of the device driver in communication between entertainment device 2 and controller 5 for the second and subsequent times can be dispensed with, which greatly improves the convenience for the user.

Also, the present invention is not limited to the above-described embodiment but it also includes modifications such as the following.

In the above-describe embodiment, controller 5 is shown as the external device. However, the program output unit, program recording unit, and authentication module may be provided in a card memory of the entertainment device. In this way if, for example, only a card memory of small capacity is supported by an old-model entertainment device, then even if a previous application is used with a new-model entertainment device, a card memory of large capacity that will be supported by the new entertainment device, can be used as the recording medium.

Also, in the above-described embodiment, electronic equipment communication system 1 is constituted as a system that includes home-use entertainment device 2 and controller 5 by which entertainment device 2 is operated. However, this invention may also be used in a system that is provided between a personal computer and various external devices to be connected to the personal computer, such as an external hard disk, modem, printer, scanner, etc.

In addition, specific structures and procedures, etc. when this invention is implemented may be made into other structures, etc. within the range that allows the object of this invention to be attained.

Effects of the Present Invention

With the aforesaid electronic equipment communication system, external device, electronic equipment, and electronic equipment communication method of this invention, because the external device has a program recording unit and a program output unit and can output to the electronic equipment the optimum control program for controlling the external device itself, by using the control program that is output from the external device, the effect is obtained of being able to fully elicit the performance of the external device.

Since the communication system of the present invention is constituted so that the device driver or other control program is loaded just by connecting the external device, the effect is obtained that no complex operation arises such as the operation of installing the control program in the electronic equipment.

I claim:

1. An electronic equipment communication system comprising electronic equipment and an external device that is connected to the electronic equipment, and by which communication takes place there between them, wherein said external device includes:

a program recording unit in which a control program that controls the external device is recorded, and a program output unit that outputs the control program recorded in said program recording unit to said electronic equipment in response to a request from said electronic equipment connected to said external device, a first authentication means that, when connected to said electronic equipment, outputs prior to the output of said control program a first identification signal of said external device and a second identification signal that is an encoded version of said first identification signal, wherein said electronic equipment, using a second authentication means, compares and verifies whether the first and second identification signals match, and if said electronic equipment certifies that the connection with said external device is a correct connection, outputs the control program from said program output unit of said external device and controls said external device based on said control program outputted from said program output unit.

2. The electronic equipment communication system as described in claim 1, wherein said external device is a controller.

3. The electronic equipment communication system as described in claims 1 or 2, wherein said electronic equipment has a nonvolatile main body-side program recording unit that stores control programs that control connected external devices, and a program judgment means that compares and judges control programs recorded in said main body-side program recording unit and said program recording unit.

4. The electronic equipment communication system as described in claim 3, wherein said electronic equipment has a program writing means that writes into said main body-side program recording unit the control program that is outputted from said program output unit.

5. An external device which is connectable to electronic equipment to provide communication with said electronic equipment, the external device comprising:

a program recording unit which is used by the electronic equipment in which a control program that controls the external device is recorded, a program output unit that outputs said control program recorded in said program recording unit, to the electronic equipment in response to a request from the electronic equipment, and an authentication means that, when connected to said electronic equipment, outputs prior to the output of said control program a first identification signal of said external device and a second identification signal that is an encoded version of said first identification signal, said first and second identification signals being compared by said electronic equipment to verify a correction connection between said external device and said electronic equipment prior to the output of said control program from said program output unit to said electronic equipment.

6. The external device as described in claim 5, wherein said external device is a controller.

7. Electronic equipment to which an external device is connectable to provide communication of the electronic equipment with the external device, the electronic equipment comprising an authentication means that decodes a first identification signal and an encoded version of said first identification signal and-outputted from said external device and compares the two signals and authenticates whether a correct external device has been connected to the electronic equipment.

8. The electronic equipment as described in claim 7, wherein said external device is a controller.

9. The electronic equipment as described in claim 7 or 8, further comprising a nonvolatile main body-side program recording unit that stores a control program that controls the external device connected to the electronic equipment and a program judgment means that compares and judges control programs recorded in said main body-side program recording unit and the control program that is to be outputted from said external device and controls the external device.

10. The electronic equipment as described in claim 9, further comprising a program writing means that writes into said main body-side program recording unit the control program that is outputted from said external device.

11. An electronic equipment communication method comprising:

a program output procedure that is carried out between an electronic equipment and an external device that is connectable to the electronic equipment, an external device control procedure by which said electronic equipment performs control of said external device based on a control program outputted from said external device, and authenticating, in an authentication means of the electronic equipment prior to said program output procedure, whether a connection between the electronic equipment and the external device is the correct connection by comparing a first identification signal output from said external device with a second identification signal, which is an encoded version of said first identification signal, output by said external device, and verifying whether said first and second identification signals match.

12. The electronic equipment communication method as described in claim 11, wherein said external device is a controller.

13. The electronic equipment communication method as described in claims 11 or 12, further comprising the steps of comparing and judging in a program judgment means of the electronic equipment respective control programs recorded in a nonvolatile main body-side program recording unit of the external device that stores a control program that controls external devices connected to said electronic equipment, and in said program recording unit.

14. The electronic equipment communication method as described in claim 13, and further comprising the steps of comparing and judging in a program writing procedure that writes into said main body-side program recording unit the control program that is supplied from said program recording unit according to the results of said program judgment procedure.

* * * * *